US009543602B2

(12) United States Patent
Mai et al.

(10) Patent No.: US 9,543,602 B2
(45) Date of Patent: Jan. 10, 2017

(54) METHOD AND REGULATION APPARATUS FOR OPERATING A FUEL CELL OR A FUEL CELL STACK

(71) Applicant: Hexis AG, Winterthur (CH)

(72) Inventors: Andreas Mai, Constance (DE); Hanspeter Kuratli, Uster (CH)

(73) Assignee: HEXIS AG, Winterthur (CH)

( * ) Notice: Subject to any disclaimer, the term of this patent is extended or adjusted under 35 U.S.C. 154(b) by 6 days.

(21) Appl. No.: 14/256,264

(22) Filed: Apr. 18, 2014

(65) Prior Publication Data

US 2014/0315114 A1 Oct. 23, 2014

(30) Foreign Application Priority Data

Apr. 18, 2013 (EP) .................... 13164356

(51) Int. Cl.
*H01M 8/04* (2016.01)
*H01M 8/12* (2016.01)

(52) U.S. Cl.
CPC ..... *H01M 8/04701* (2013.01); *H01M 8/04007* (2013.01); *H01M 8/0432* (2013.01); *H01M 8/0438* (2013.01); *H01M 8/04559* (2013.01); *H01M 8/04604* (2013.01); *H01M 8/04641* (2013.01); *H01M 8/04731* (2013.01);
(Continued)

(58) Field of Classification Search
CPC ..................... H01M 8/04701; H01M 8/04007; H01M 8/0432; H01M 8/0438; H01M 8/04559; H01M 8/04604; H01M 8/04641; H01M 8/04731; H01M 8/04753; H01M 8/04865; H01M 8/04082; H01M 2008/1293; Y02E 60/50; Y02E 60/525
See application file for complete search history.

(56) References Cited

U.S. PATENT DOCUMENTS 7,749,626 B2 * 7/2010 Take ................ H01M 8/04089
429/423
2005/0089729 A1 * 4/2005 Jones ................ H01M 8/04559
429/432
(Continued)

FOREIGN PATENT DOCUMENTS

JP H11-195423 A 7/1999
WO 2005/004261 A2 1/2005

OTHER PUBLICATIONS

Search Report mailed Nov. 19, 2013, from European Application No. 13164356.1 (4 pages).

*Primary Examiner* — Gregg Cantelmo
(74) *Attorney, Agent, or Firm* — Kilpatrick Townsend & Stockton LLP

(57) ABSTRACT

Disclosed is method of operating a fuel cell which can output an electrical maximum power dependent on the operating temperature for a given fuel gas flow, and which exhibits aging in dependence on the operating duration which brings about an increase of the electrical internal resistance with progressive operating duration. In the disclosed method, the starting value ($T_0$) of the operating temperature for a new fuel cell or for a new fuel cell stack is typically smaller than or equal to the operating temperature, at which the electrical maximum power is achieved and the fuel cell or the fuel cell stack is regulated such that the decrease of the output electrical power as a consequence of aging is partly or completely compensated in that the operating temperature (T) of the fuel cell or of the fuel cell stack is increased with progressive aging.

12 Claims, 3 Drawing Sheets

Figure 1:
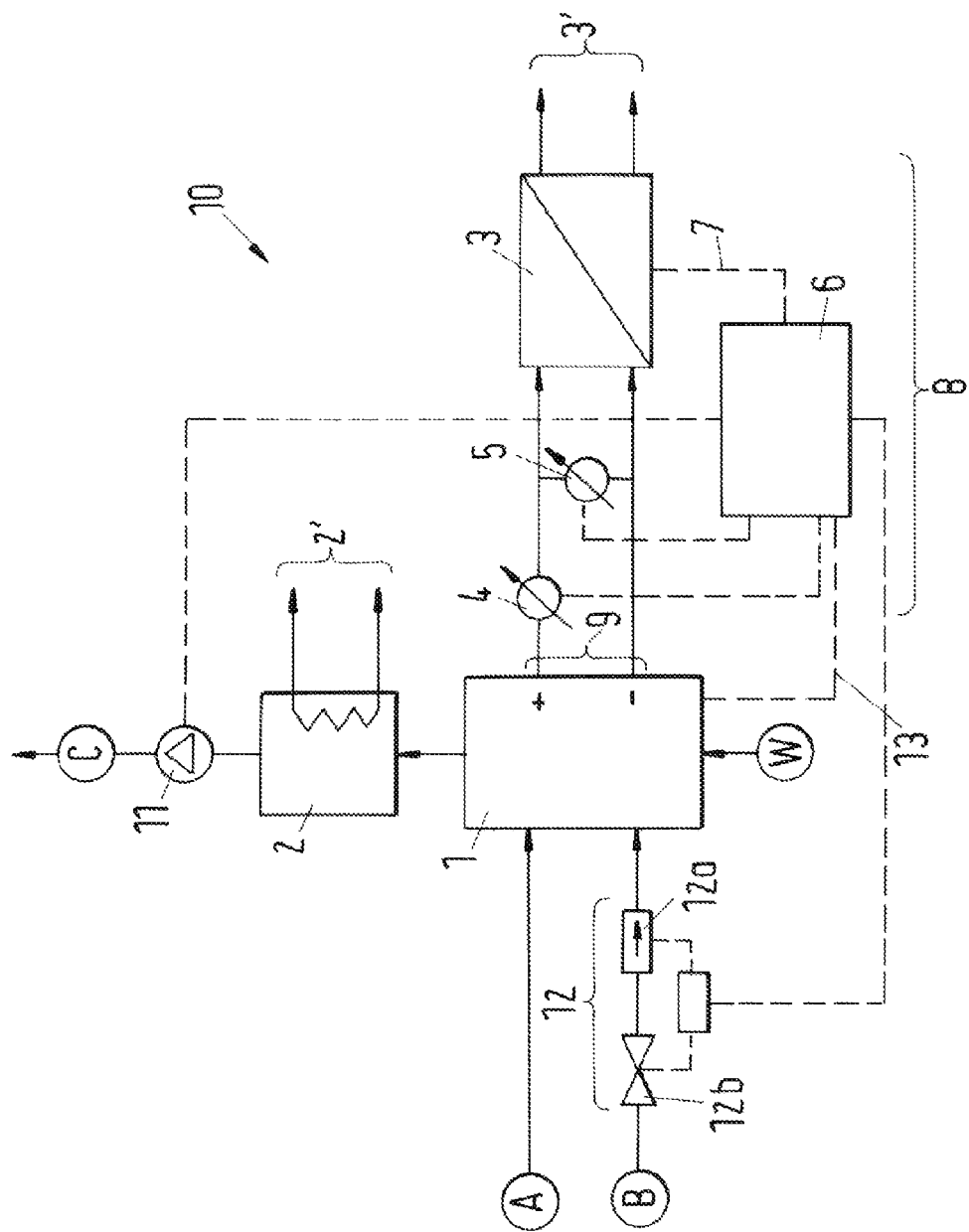

(52) U.S. Cl.
CPC ... *H01M 8/04753* (2013.01); *H01M 8/04865* (2013.01); *H01M 8/04082* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 2005/0112420 A1* | 5/2005 | Lai | H01M 8/04559 429/432 |
| 2005/0197743 A1* | 9/2005 | Rusta-Sallehy | C25B 15/02 700/300 |
| 2010/0151287 A1 | 6/2010 | Chowdhury | |
| 2010/0173212 A1 | 7/2010 | Senoue et al. | |

* cited by examiner

METHOD AND REGULATION APPARATUS FOR OPERATING A FUEL CELL OR A FUEL CELL STACK

This application claims priority to European Patent Application No. 13164356.1, filed Apr. 18, 2013, the disclosure of which is incorporated by reference herein.

The invention relates to a method and to a regulation apparatus for operating a fuel cell or a fuel cell stack in accordance with the preamble of claim 1 or the preamble of claim 12, as well as to a fuel cell, a fuel cell stack and a fuel cell stack system having such a regulation apparatus.

Fuel cells, in particular high temperature fuel cells of the SOFC type ("Solid Oxide Fuel Cell") enable a utilization of the energy provided by a fuel through conversion of energy. In this connection both electrical energy, which is generated due to electrochemical processes, as well as thermal energy, which accrues in the form of hot exhaust gases of the processes, can be used. Gas-like flows of two educts are guided separately through the cells. The first educt, which in particular is environmental air, includes oxidizing components, the second educt includes reducing components. Advantageously, a gas containing a methane is used as a second educt (e.g. natural gas) which is guided through a reformer prior to the entry into the cells and is converted there, for example, by means of an additional introduction of water and possibly air and on the supply of process heat, into the components hydrogen and carbon monoxide to be reduced. The hot exhaust gas can be advantageously used as a source for the process heat required in the reformer.

A method of operating a fuel cell battery is, for example, known from the document EP 1 205 993 A1. In this method, a regulation of the fuel cell battery is described which is dependent on the required power.

In practice, fuel cells and fuel cell stacks are generally operated with constant operating temperature and, as long as the required power and the gas composition do not change, with constant fuel gas flow. Moreover, the operation generally takes place in the vicinity of an electrical maximum power achievable for a given fuel gas flow, since there the fuel gas exploitation is best.

As shown in the following, the operation at constant operating temperature and constant fuel gas flow is not ideal.

The internal resistance of a fuel cell or of a fuel cell stack and in this way electrical losses reduce with increasing temperature. On the other hand, the theoretical degree of efficiency $\eta_{theor.}$ at the internal resistance 0 is higher due to the subsequent equation [1] at lower temperatures.

$$\eta_{theor.} = \frac{\Delta G}{\Delta H} = \frac{\Delta H - T \Delta S}{\Delta H} \quad [1]$$

where G=Gibb's energy
H=enthalpy
T=temperature
S=entropy.

Since the temperature influences on the internal resistance and on the theoretical degree of efficiency are counterproductive an ideal operating temperature is given which additionally depends on the internal resistance.

Figure 3A:
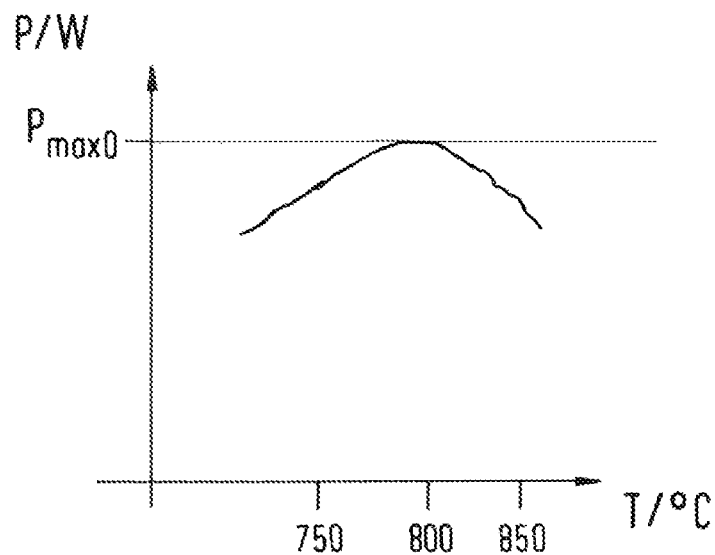

FIG. 3A shows a typical extent of the output electrical power P as a function of the operating temperature T of a fuel cell or of a fuel cell stack in the new state for a given fuel gas flow. The maximum $P_{max0}$ of the output electrical power can be recognized clearly.

The internal resistance of the fuel cell or of the fuel cell stack increases in time due to material degradations (aging) and the ideal operating temperature is shifted to higher temperatures in time.

Figure 3B:
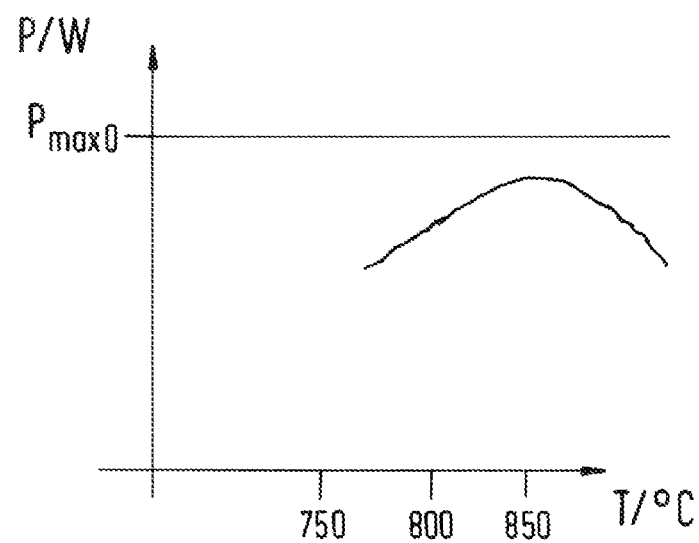

FIG. 3B shows a typical extent of the output electrical power P as a function of the operating temperature T of a fuel cell or of a fuel cell stack after 20,000 h operating time at an operating temperature of 750° C. and a constantly maintained fuel gas flow. The maximum of the output electrical power is reduced with respect to the maximum $P_{max0}$ in the new state of the fuel cell or of the fuel cell stack and has shifted in comparison to the extent of the power shown in FIG. 3A to higher operating temperatures.

Additionally, the material degradation also depends on the operating temperature. At lower temperatures the material degradation is indeed smaller, however, the internal resistance is increased as a consequence of the lower temperature such that the material degradation is noticeably stronger.

Besides the mentioned effects on the internal resistance and in this way on the electrical degree of efficiency a further interfering effect of the material degradation consists therein that the user is confronted with a decrease of the electrical power output by the fuel cell or the fuel cell stack in the course of time.

The above-described associations are generally not considered when the fuel cell or the fuel cell stack is operated at a constant operating temperature as was common until now.

It is the object of the invention to make available a method of operating a fuel cell or a fuel cell stack and a regulation apparatus, as well as a fuel cell and a fuel cell stack for carrying out this method by means of which the lifetime of the fuel cell or of the fuel cell stack is increased and the effects of aging on the output electrical power can be reduced.

This object is satisfied in accordance with the invention by the method defined in claim 1.

The method in accordance with the invention, for operating a fuel cell or a fuel cell stack which fuel cell or fuel cell stack can output an electrical maximum power dependent on the operating temperature at a given fuel gas flow, and which exhibits aging in dependence on the operating duration which brings about an increase of the electrical internal resistance with progressive operating duration, is characterized in that for a new fuel cell or for a new fuel cell stack a starting value of the operating temperature is predefined which is expediently smaller than the maximum specified operating temperature for the fuel cell or the fuel cell stack and the fuel cell or the fuel cell stack is regulated such that the decrease of the output electrical power as a consequence of the aging is partly or completely compensated, in that the operating temperature of the fuel cell or of the fuel cell stack is increased with progressive aging. Advantageously, the operating temperature is increased with progressive aging for so long until the maximum specified operating temperature for the fuel cell or the fuel cell stack is achieved.

The starting value of the operating temperature is advantageously smaller or equal to the operating temperature at which the electrical maximum power is achieved. For SOFC fuel cells the starting value of the operating temperature typically lies between 740° C. and 800° C.

Advantageously an upper threshold for the output electrical power is predefined, wherein this upper threshold, for example, can amount to at most 80% or at most 90% or at most 95% of the electrical maximum power of a new fuel cell or of a new fuel cell stack.

In an advantageous embodiment the decrease of the output electrical power as a consequence of aging as compensated in that the electrical output voltage of the fuel cell or of the fuel cell stack is decreased with progressive aging, wherein, for example, a starting value for the output voltage can be predefined which is higher than the output voltage value at which the electrical output power is maximum for a given fuel gas flow and a given operating temperature.

Advantageously the output voltage is decreased for so long until the output voltage value is achieved at which the electrical output voltage is maximum for a given fuel gas flow and a given operating temperature.

In a further advantageous embodiment the decrease of the output electrical power as a consequence of aging is compensated in that the fuel gas flow is increased with progressive aging, wherein, for example, a starting value for the fuel gas flow can be predefined which is smaller than the maximum specified fuel gas flow for the fuel cell or the fuel cell stack.

Advantageously the fuel gas flow is increased for so long until the maximum specified fuel gas flow is achieved for the fuel cell or the fuel cell stack.

The above-described embodiments can be combined in difference sequence as a pair or in threes in that, for example, a starting value for the electrical output voltage is predefined, which is higher than the output voltage value at which for a given fuel gas flow and for a given operating temperature the electrical output power becomes maximum; and/or a starting value for the fuel gas flow is predefined which is smaller than the maximum specified fuel gas flow for the fuel cell or the fuel cell stack and a starting value of the operating temperature is predefined which is smaller than the maximum specified operating temperature of the fuel cell or of the fuel cell stack;
wherein, depending on the case, in a first phase, the decrease of the output electrical power as a consequence of aging is compensated in that the electrical output voltage is decreased, up until the output voltage value is achieved at which the electrical output voltage is maximum for a given fuel gas flow and a given operating temperature;
wherein, depending on the case, in a second phase, the decrease of the output electrical power as a consequence of aging is compensated in that the fuel gas flow is increased until the maximum specified fuel gas flow is achieved for the fuel cell or the fuel cell stack; and
wherein, depending on the case, in a third phase, the decrease of the output electrical power as a consequence of aging is compensated in that the operating temperature of the fuel cell or of the fuel cell stack is increased until the maximum specified operating temperature is achieved for the fuel cell or the fuel cell stack.

Independent of the embodiment, if required, a current voltage characteristic line of the fuel cell or of the fuel cell stack is detected during operation in intervals in time whose gradient has a minimum and a value for the minimum of the gradient or a value $R_{min}$ associated with the minimum of the gradient is respectively determined, wherein a point of reference is determined for the operating point by a mathematical linking of the determined value to a predetermined offset value $R_{offset}$, in particular by an addition of a predetermined offset value to the determined value and the output voltage of the fuel cell or of the fuel cell stack is regulated on use of the thus determined point of reference.

Advantageously the output voltage of the fuel cell or of the fuel cell stack is regulated via a regulatable consumer or a regulatable current sink which is connected to the output of the fuel cell or of the fuel cell stack.

The invention further comprises a regulation apparatus for a fuel cell or a fuel cell stack or a fuel cell stack system which is installed in order to control and/or to regulate the fuel cell or the fuel cell stack or the fuel cell stack system respectively by means of a method in accordance with any one of the above described embodiments and variants.

In an advantageous embodiment the regulation apparatus additionally includes a regulatable consumer or a regulatable current sink which can be connected to the output of the fuel cell or of the fuel cell stack in order to regulate the output voltage of the fuel cell or of the fuel cell stack via the regulatable consumer or the regulatable current sink, wherein the regulatable consumer can, for example, be a voltage converter or an inverter whose outputs can be connected to the power grid in order to introduce the current produced in the fuel cell into the power grid.

The invention further comprises a fuel cell or a fuel cell stack having a regulation apparatus or an embodiment of the regulation apparatus in accordance with the above description.

The method of operating a fuel cell or a fuel cell stack and the regulation apparatus, as well as the fuel cell and the fuel cell stack in accordance with the present invention have the advantage that the aging effects are reduced thanks to the low starting value of the operating temperature and that the lifetime of the fuel cell and of the fuel cell stack can be increased and the user is simultaneously made available a substantially constant electrical power for a large portion of the lifetime thanks to the regulation which partly or completely compensates the decrease of the output electrical power as a consequence of aging.

The above description of embodiments and variants merely serves as an example. Further advantageous embodiments result from the dependent claims and the drawings. Furthermore, also individual features from the described or shown embodiments and variants can be combined with one another in the framework of the present invention in order to form new embodiments.

Figure 2:
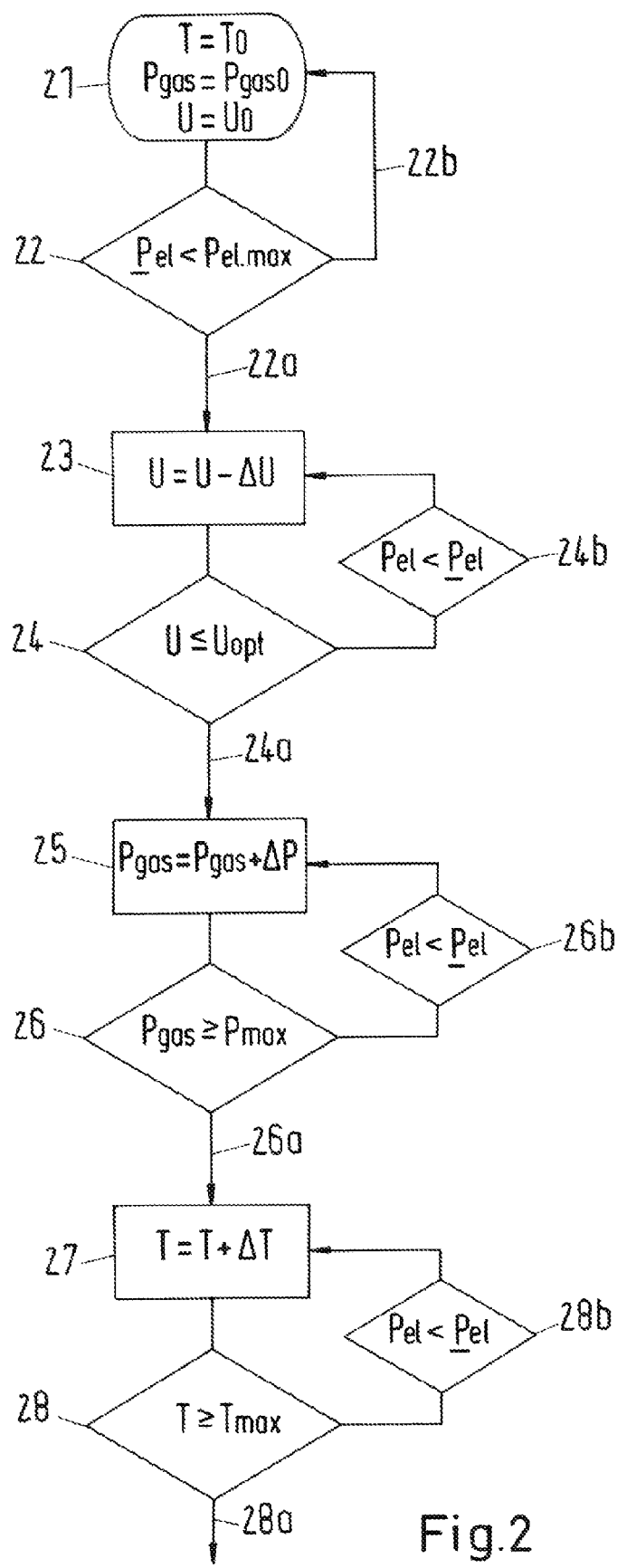

In the following the invention will be described by means of the embodiments and by means of the drawing in detail. There is shown:

FIG. 1 an embodiment of a fuel cell stack having a regulation apparatus in accordance with the present invention;

FIG. 2 a schematic illustration of an embodiment of a method in accordance with the present invention; and FIG. 3A, B a typical extent of the output electrical power as a function of the operating temperature for a fuel cell or a fuel cell stack in the new state and following a predetermined operating time.

FIG. 1 shows an embodiment of a fuel cell stack 1 having a regulation apparatus 8 in accordance with the present invention. An arrangement of a fuel cell stack having a regulation apparatus will be referred to in the following also as a fuel cell system 10. The fuel cell stack 1 can, for example, be assembled of high temperature fuel cells of the SOFC type ("Solid Oxide Fuel Cell") which typically is operated at a temperature of 600° C. to 1000° C. and enables the use of energy of a fuel by conversion of energy. In this connection, both electrical energy, generated due to electrochemical processes, and thermal energy, arising in the form of hot gas exhaust gases of the processes, can be used. During operation, gas-like flows of two educts A, B are guided separately through the cells. The first educt A which can, for example, be environmental air, includes oxidizing components, the second educt B includes reducing components.

Advantageously, a gas containing methane (e.g. natural gas) is used as a second educt B which is guided through a reformer, not shown in FIG. 1, prior to the entry into the cells and is converted there, for example, by means of an additional introduction of water W and possibly air and on the supply of process heat into the reducing components hydrogen and carbon monoxide. The hot exhaust gas can advantageously be used as a source for the process heat required by the reformer.

The fuel cell stack 1 is generally connected to a heat exchanger 2 in which the heat can be removed from the hot exhaust gases from the fuel cell stack. The heat exchanger 2 is advantageously connected to a heating circuit 2'. The exhaust gases C can subsequently be guided into free air or the residual oxygen in the exhaust gas can be used in an additional burner which is not illustrated in FIG. 1.

The fuel cell or the fuel cell stack 1 or the fuel cell stack system in accordance with the present invention includes a regulation apparatus 8 which is installed in order to control and/or to regulate the fuel cell or the fuel cell stack or the fuel cell stack system in accordance with one of the subsequently described methods in accordance with the invention.

The method in accordance with the present invention, for operating a fuel cell or a fuel cell stack 1 which fuel cell or fuel cell stack can output an electrical maximum power dependent on the operating temperature at a given fuel gas flow, and which exhibits aging in dependence on the operating duration which brings about an increase of the electrical internal resistance with progressive operating duration and generally the output electrical power decreases, is characterized in that, for a new fuel cell or for a new fuel cell stack, a starting value of the operating temperature is predefined which is expediently smaller than the maximum specified operating temperature for the fuel cell or the fuel cell stack and the fuel cell or the fuel cell stack is regulated such that the decrease of the output electrical power as a consequence of aging is partly or completely compensated, in that the operating temperature of the fuel cell or of the fuel cell stack is increased with progressive aging.

Advantages embodiments and variants of the method are described in the following part of the description.

If required a blower 11 can be arranged at the input side or of the output side of the fuel cell stack 1 or of the heat exchanger 2 by means of which the gas through-flow, for example the through-flow of educt A (e.g. environmental air) through the fuel cell stack can be increased.

In an advantageous embodiment of the fuel cell or of the fuel cell stack the blower 11 is connected to the regulation apparatus 8 which can be connected, for example, via a line 13 to a non-shown temperature sensor in the interior of the fuel cell stack in order to detect the operating temperature of the fuel cell stack and to regulate and/or control the operating temperature via a matching of the blower number of rotations.

Furthermore, a mass flow regulator 12 can be provided in at least one of the supply lines for the educt A, B for the fuel cell stacks in order to regulate or to control, for example, the fuel gas flow. The mass flow regulator can, for example, comprises a regulation valve 12b and a mass flow sensor 12a which is connected to the regulation valve via a control unit.

In an advantageous embodiment the control unit of the mass flow regulator 12 is connected to the regulation apparatus 8 in order to control and/or to regulate the mass flow.

In a further advantageous embodiment the regulation apparatus 8 is connected to an electrical output 9 of the fuel cell stack 1. The regulation apparatus 8 in this embodiment includes a measurement and regulation unit 6, which is installed in order to detect a current voltage characteristic line of the fuel cell stack in intervals in time whose gradient has a minimum, for example, by means of a current sensor 4 and/or a voltage sensor 5 and to determine a value for the minimum of the gradient or a value $R_{min}$ correlated to the minimum of the current from the detected current voltage characteristic line in order to determine a point of reference for the operating point by means of a mathematical linking of the determined value to a predetermined offset value ($R_{offset}$), for example, by addition of a predetermined offset value to the detected value or by multiplication of the determined value with an offset value, and in order to regulate the output voltage of the fuel cell stack 1 on use of the so determined point of reference, for example, with a point of reference or a desired value derived from the point of reference for the output voltage or the output current of the fuel cell stack.

In a further advantageous embodiment the regulation apparatus 8 includes a regulatable consumer or a regulatable current sink 3 which can be connected to the output 9 of the fuel cell or of the fuel cell stack in order to regulate the output voltage of the fuel cell or of the fuel cell stack 1 via the regulatable consumer or the regulatable current sink. For this purpose, the measurement and regulation unit 6 can be connected to the regulatable consumer or to the regulatable current sink, for example, via a line 7.

Advantageously, the regulatable consumer 3 is a voltage transformer or an inverter whose outputs can be connected to a current grid 3' in order to inject the current generated in the fuel cell stack into the current grid.

An embodiment of a method in accordance with the present invention for operating a fuel cell or a fuel cell stack 1 will be described in the following by reference to the FIGS. 1 and 2. In the method the fuel cell or the fuel cell stack has an electrical maximum power $P_{el.max}$ at a given fuel gas flow which can be output in dependence on the operating temperature as well as having an aging dependent on the operating duration which brings about an increase of the electrical internal resistance with progressive operating duration and, without counter measures, that the output electrical power $P_{el}$ generally reduces. The method characterizes itself in that, for a new fuel cell or a new fuel cell stack, a starting value $T_0$ of the operating temperature is predefined which is expediently smaller than the maximum specified operating temperature for the fuel cell or the fuel cell stack and the fuel cell or the fuel cell stack 1 is regulated such that the decrease of the output electrical power as a consequence of aging is partly or completely compensated in that the operating temperature T of the fuel cell or of the fuel cell stack is increased with progressive aging.

The starting value $T_0$ of the operating temperature is advantageously smaller than or equal to the operating temperature at which the electrical maximum power is achieved and typically lies between 740° C. and 800° C.

Advantageously, the operating temperature T is increased for so long with progressive aging (step 27 in FIG. 2) until the maximum specified operating temperature $T_{max}$ is achieved for the fuel cell or the fuel cell stack. This corresponds to the termination criterion 28 in the embodiment shown in FIG. 2, with the loop formed by the steps 27, 28 and 28b being run through for so long until $T \geq T_{max}$. The condition $P_{el} < \underline{P}_{el}$ in step represents a waiting loop which delays the increase of the operating temperature T for so long until the decrease of the output electrical power as a consequence of aging has undercut a predefined power value $\underline{P}_{el}$. When the termination criterion $T \geq T_{max}$ is satisfied the method can, for example, be continued with an instruction to jump 28a.

The instruction to jump 28a can, for example, cause an alarm which indicates that the fuel cell stack 1 must be exchanged within a predeterminable time frame.

Advantageously, an upper threshold $\underline{P}_{el}$ for the output electrical power is predefined, wherein this upper threshold can, for example, amount to at most 80% or at most 90% or at most 95% of the electrical maximum power of a new fuel cell or of a new fuel cell stack (condition 22 in FIG. 2).

In an advantageous embodiment the decrease of the output electrical power as a consequence of aging is compensated in that the electrical output voltage U of the fuel cell or of the fuel cell stack is reduced with progress aging, wherein, for example, a starting value $U_0$ can be predefined for the output value which starting value is higher than the output voltage value $U_{opt}$ at which for a given fuel gas flow and a given operating temperature the electrical output power is at maximum.

Advantageously, the output voltage U is reduced for so long (step 23 in FIG. 2) until the output voltage $U_{opt}$ is achieved at which for a given fuel gas flow and a given operating temperature the electrical output power is maximum. This corresponds to the termination criterion 24 in the embodiment shown in FIG. 2, with the loop formed by the steps 23, 24 and 24b being run through for so long until $U \leq U_{opt}$. The condition $P_{el} < \underline{P}_{el}$ in step 24b represents a waiting loop which delays the decrease of the output voltage U for so long until the decrease of the output electrical power as a consequence of aging undercuts a predefined power value $\underline{P}_{el}$. When the termination criterion $U \leq U_{opt}$ is satisfied the method can, for example, be continued with an instruction to jump 24a.

In a further advantageous embodiment the decrease of the output electrical power as a consequence of aging is compensated in that the fuel gas flow $P_{gas}$ is increased with progressive aging, wherein, for example, a starting value $P_{gas0}$ for the fuel gas flow can be predefined which is smaller than the maximum specified fuel gas flow $P_{max}$ for the fuel cell or the fuel cell stack.

Advantageously, the fuel gas flow $P_{max}$ is increased for so long (step 25 in FIG. 2) until the maximum specified fuel gas flow $P_{max}$ is achieved for the fuel cell of the fuel cell stack. This corresponds to the termination criterion 26 in the embodiment shown in FIG. 2, with the loop formed by the steps 25, 26 and 26b being run through for so long until $P_{gas} \geq P_{max}$. The condition $P_{el} < \underline{P}_{el}$ in step 26b represents a waiting loop which delays the increase of the fuel gas flow $P_{gas}$ for so long until the decrease of the output electrical power as a consequence of aging undercuts a predefined power value $\underline{P}$el. When the termination criterion $P_{gas} \geq P_{max}$ is satisfied, the method can, for example, be continued with an instruction to jump 26a.

The above described embodiments and variants can be combined with one another in different sequences in pairs or in threes, in that, for example, a starting value $U_0$ for the electrical output voltage U is predefined, which is higher than the output voltage value $U_{opt}$, at which, for a given flow gas flow and a given operating temperature, the electrical output power is maximum and/or a starting value $P_{gas0}$ for the fuel gas flow $P_{gas}$ is predefined which is smaller than the maximum specified fuel gas flow $P_{max}$ for the fuel cell or the fuel cell stack and a starting value $T_0$ of the operating temperature T is predefined which is smaller than the maximum specified operating temperature $T_{max}$ for the fuel cell or the fuel cell stack (step 21 in FIG. 2), wherein, depending on the case, in a first phase, the decrease of the output electrical power as a consequence of aging is compensated in that the electrical output voltage U is decreased until the output voltage value $U_{opt}$ is achieved at which the electrical output power is a maximum weighting loop, wherein, depending on the case, in a second phase, the decrease of the output electrical power as a consequence of aging is compensated in that the fuel gas flow $P_{gas}$ is increased until the maximum specified fuel gas flow $P_{max}$ is achieved for the fuel cell of the fuel cell stack and wherein, depending on the case, in a third phase, the decrease of the output electrical power as a consequence of aging is compensated in that the operating temperature T of the fuel cell or of the fuel cell stack is increased until the maximum specified operating temperature $T_{max}$ for the fuel cell or the fuel cell stack is achieved.

Independent of the embodiment, if required, a current voltage characteristic line of the fuel cell or of the fuel cell stack can be detected in intervals in time during operation whose gradient has a minimum and a value for the minimum of the gradient or a value $R_{min}$ associated with the minimum of the gradient is respectively determined from the detected current voltage characteristic line, wherein a point of reference for the operating point is determined by a mathematical linking of the determined value to a predetermined offset value $R_{offset}$, for example, by addition of a predetermined offset value to the determined value or by multiplication with a predetermined offset value and the output voltage of the fuel cell or of the fuel cell stack is regulated on use of the thus determined point of reference.

Advantageously, a point of reference for the output voltage U is determined in this manner, wherein the thus determined point of reference can be used as an approximation for the output voltage value $U_{opt}$ at which the electrical output power is maximum for a given fuel gas flow and a given operating temperature.

In an advantageous variant of an embodiment the fuel or the fuel cell stack is guided by voltage, this means it is regulated at a desired value for the cell voltage or for the output voltage which desired value is smaller than or equal to the above determined point of reference.

The value for the minimum of the gradient can, for example, be the value of the internal resistance or the area specific resistance also referred to as ASR of the fuel cell or of the fuel cell stack at the minimum of the gradient or the value $R_{min}$ associated with the minimum of the gradient, depending on the case, can be linked to the value of the internal resistance or the area specific resistance of the fuel cell or of the fuel cell stack at the minimum of the gradient. The area specific resistance ASR is calculated from the internal resistance of a fuel cell in that the internal resistance is respectively multiplied with the electrochemically active surfaces of the fuel cell, or in that the internal resistance is multiplied with a repeated unit of a fuel cell stack of the electrochemical active surface of a repeater unit.

Advantageously the value for the minimum of the gradient or the value $R_{min}$ associated with the minimum of the gradient is mathematically determined from the current voltage characteristic line, for example numerically or by mathematical derivation of the current voltage characteristic line.

In a further advantageous embodiment a current characteristic line of the fuel cell or of the fuel cell stack is determined during operation after at least 200 h or at least 500 h or after at least 1000 h or every 200 h or every 500 h or every 1000 h and the point of reference is newly determined from the detected current voltage characteristic line.

Advantageously, the output voltage of the fuel cell or of the fuel cell stack 1 is regulated via a regulatable consumer or a regulatable current sink 3 which is connected to the output 9 of the fuel cell or of the fuel cell stack, wherein the regulatable consumer 3 can, for example, be a voltage transformer or an inverter whose outputs 3' can be connected to the current grid in order to introduce the current generated in the fuel cell or the fuel cell stack into the current grid.

The method and the regulation apparatus for regulating a fuel cell or a fuel cell stack, as well as the fuel cell and the fuel cell stack in accordance with the present invention have the advantage that thanks to the lower starting value of the operating temperature the aging is reduced and the lifetime of the fuel cell and of the fuel cell stack can be increased. Moreover, the fuel cell or the fuel cell stack respectively can be operated securely even when the operating conditions change in the course of time. A further advantage consists therein that the user is made available a substantially constant electrical power over a large portion of the lifetime thanks to the regulation used in the method.

The invention claimed is:

1. A method of operating a fuel cell or a fuel cell stack wherein the fuel cell or fuel cell stack can output an electrical maximum power dependent on the operating temperature for a given fuel gas flow, and which exhibits aging in dependence on the operating duration which brings about an increase of the electrical internal resistance with progressive operating duration, wherein in the method a starting value ($T_0$) of the operating temperature is predefined which is smaller than the maximum specified operating temperature ($T_{max}$) for the fuel cell or the fuel cell stack and the fuel cell or the fuel cell stack is regulated such that the decrease of the electrical power output as a consequence of aging is partly or completely compensated in that the operating temperature (T) of the fuel cell or of the fuel cell stack is increased with progressive aging;

wherein the decrease of the output electrical power as a consequence of aging is compensated, in that the fuel gas flow ($P_{gas}$) is increased with progressive aging; and with a starting value ($P_{gas0}$) being predefined for the fuel gas flow which starting value is smaller than the maximum specified fuel gas flow ($P_{max}$) for the fuel cell or the fuel cell stack.

2. The method in accordance with claim 1, wherein the starting value ($T_0$) of the operating temperature is smaller than or equal to the operating temperature at which the electrical maximum power is achieved and wherein the starting value ($T_0$) of the operating temperature lies between 740° C. and 800° C.

3. The method in accordance with claim 1, wherein the operating temperature (T) is increased with progressive aging for so long until the maximum specific operating temperature ($T_{max}$) is achieved for the fuel cell or the fuel cell stack.

4. The method in accordance with claim 1, wherein an upper threshold for the output electric power (P) is predefined; and wherein this upper threshold amounts to at most 80% of the electrical maximum power.

5. The method in accordance with claim 1, wherein the decrease of the output electrical power as a consequence of aging is compensated, in that the electrical output voltage (U) of the fuel cell or of the fuel cell stack is reduced with progressive aging; and with a starting value ($U_0$) being predefined for the output voltage which is higher than the output voltage value ($U_{opt}$) at which the electrical output power is maximum for a given fuel gas flow and a given operating temperature.

6. The method in accordance with claim 5, wherein the output voltage (U) is reduced so far until the output voltage value ($U_{opt}$) is achieved at which the electrical output power is maximum for the fuel cell or the fuel cell stack.

7. The method in accordance with claim 1, wherein the fuel gas flow ($P_{gas}$) is increased for so long until the maximum specified fuel gas flow ($P_{max}$) is achieved for the fuel cell or the fuel cell stack.

8. The method in accordance with claim 1, wherein a starting value ($U_0$) for the electric output voltage is predefined which is larger than the output voltage value ($U_{opt}$), at which, for a given fuel gas flow and a given operating temperature, the electrical output power is maximum; and a starting value ($P_{gas0}$) for the fuel gas flow is predefined which is smaller than the maximum specified fuel gas flow ($P_{max}$) for the fuel cell or the fuel cell stack; and a starting value ($T_0$) of the operating temperature is predefined which is smaller than the maximum specific operating temperature ($T_{max}$) for the fuel cell or the fuel cell stack, wherein in a first phase the decrease of the output electrical power as a consequence of aging is compensated in that the electrical output voltage (U) is decreased up until the output voltage value ($U_{opt}$) is achieved, at which the electrical output power is maximum for a given fuel gas flow and a given operating temperature;

wherein, in a second phase, the decrease of the output electrical power as a consequence of aging is compensated in that the fuel gas flow ($P_{gas}$) is increased until the maximum specified fuel gas flow ($P_{max}$) is achieved for the fuel cell or the fuel cell stack; and wherein, in a third phase, the operating temperature (T) of the fuel cell or of the fuel cell stack is increased until the maximum specified operating temperature ($T_{max}$) is achieved for the fuel cell or the fuel cell stack.

9. The method in accordance with claim 1, wherein, during operation, a current voltage characteristic line of the fuel cell and/or the fuel cell stack is determined at intervals in time whose gradient has a minimum and a respective value for the minimum of the gradient or a value ($R_{min}$) associated with the minimum of the gradient is determined from the detected current voltage characteristic line, and wherein a point of reference for the operating point is determined by means of a mathematical linking of the determined value to a predetermined offset value are offset, by addition of a predetermined offset value to the detected value, and the output voltage of the fuel cell or of the fuel cell stack is regulated by the so determined point of reference.

10. The method in accordance with claim 1, wherein the output voltage (U) of the fuel cell or of the fuel cell stack is regulated via a regulatable consumer or a regulatable current sink which is connected to the output of the fuel cell or of the fuel cell stack.

11. The method in accordance with claim 1, wherein an upper threshold for the output electric power (P) is predefined; and wherein this upper threshold amounts to at most 90% of the electrical maximum power.

12. The method in accordance with claim 1, wherein an upper threshold for the output electric power (P) is predefined; and wherein this upper threshold amounts to at most 95% of the electrical maximum power.

* * * * *